US012469366B2

(12) United States Patent
Gansert et al.

(10) Patent No.: US 12,469,366 B2
(45) Date of Patent: Nov. 11, 2025

(54) ELECTRONIC GAMING SYSTEMS AND METHODS FOR PROVIDING INTERVAL TRIGGERS AND TIERED AWARDS

(71) Applicant: Aristocrat Technologies, Inc., Las Vegas, NV (US)

(72) Inventors: Alex Gansert, Reno, NV (US); Christmas Uberuaga, Reno, NV (US)

(73) Assignee: Aristocrat Technologies, Inc., Las Vegas, NV (US)

(*) Notice: Subject to any disclaimer, the term of this patent is extended or adjusted under 35 U.S.C. 154(b) by 306 days.

(21) Appl. No.: 18/350,645

(22) Filed: Jul. 11, 2023

(65) Prior Publication Data

US 2024/0112546 A1 Apr. 4, 2024

Related U.S. Application Data

(60) Provisional application No. 63/411,396, filed on Sep. 29, 2022.

(51) Int. Cl.
*G07F 17/32* (2006.01)
*G06F 7/58* (2006.01)

(52) U.S. Cl.
CPC .......... *G07F 17/3267* (2013.01); *G06F 7/588* (2013.01); *G07F 17/3211* (2013.01)

(58) Field of Classification Search
None
See application file for complete search history.

(56) References Cited

U.S. PATENT DOCUMENTS

| | | | | |
|---|---|---|---|---|
| 6,312,334 | B1 | 11/2001 | Yoseloff | |
| 11,640,748 | B2 * | 5/2023 | Marks | G07F 17/34 463/20 |
| 2001/0048193 | A1 | 12/2001 | Yoseloff | |
| 2002/0195773 | A1 | 12/2002 | Dunn | |
| 2003/0085514 | A1 | 5/2003 | Yoseloff | |
| 2011/0021260 | A1 | 1/2011 | Adiraju | |
| 2012/0088571 | A1 | 4/2012 | Kelly | |
| 2015/0011294 | A1 | 1/2015 | Jaffe | |
| 2017/0046924 | A1 | 2/2017 | Buriu | |
| 2021/0097812 | A1 * | 4/2021 | Malik | G07F 17/3267 |
| 2021/0304565 | A1 * | 9/2021 | Marks | G07F 17/3244 |
| 2022/0343734 | A1 * | 10/2022 | Olive | G07F 17/3244 |

FOREIGN PATENT DOCUMENTS

| | | | |
|---|---|---|---|
| GB | 2439386 | A | 12/2007 |

* cited by examiner

*Primary Examiner* — Ronald Laneau
(74) *Attorney, Agent, or Firm* — Armstrong Teasdale LLP

(57) ABSTRACT

An electronic gaming device that includes a display device, a memory device, and a game controller including a processor is described. The processor is configured to cause a base game comprising a plurality of symbols included on a plurality of reels to be displayed. The processor is also configured to cause a feature game outcome on a wheel to be displayed. The processor is also configured to cause a bonus game to be initiated and to apply a first interval of a plurality of intervals to a bonus game outcome, wherein each interval of the plurality of intervals corresponds to a tier of lookup tables. The processor is further configured to evaluate a first tier of lookup tables corresponding to the first interval and cause a feature game outcome comprising a prize symbol including a first award associated with the first tier of lookup tables to be displayed.

20 Claims, 12 Drawing Sheets

ELECTRONIC GAMING SYSTEMS AND METHODS FOR PROVIDING INTERVAL TRIGGERS AND TIERED AWARDS

CROSS-REFERENCE TO RELATED APPLICATIONS

This application claims the benefit of priority to U.S. Provisional Patent Application Ser. No. 63/411,396, filed Sep. 29, 2022, and entitled "ELECTRONIC GAMING SYSTEMS AND METHODS FOR PROVIDING INTERVAL TRIGGERS AND TIERED AWARDS," the contents and disclosures of which are hereby incorporated in their entirety.

TECHNICAL FIELD

The field of disclosure relates generally to electronic gaming, and more specifically, to electronic gaming systems and methods for providing interval triggers and tiered awards.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is provided. The electronic gaming device may include at least one display device, at least one memory device storing instructions, and at least one processor in communication with the at least one display device and the at least one memory device. The instructions, when executed by the at least one processor, may cause the at least one processor to cause the at least one display device to display a user interface associated with a feature game, the user interface including an interval display element indicating a first interval of a plurality of intervals. The instructions may further cause the at least one processor to, when the interval display element indicates the first interval, select a first tier of lookup tables corresponding to the first interval. The instructions may further cause the at least one processor to evaluate an RNG call outcome based on the first tier of lookup tables to determine a first feature game outcome. The instructions may further cause the at least one processor to cause the at least one display device to display the first feature game outcome, the first feature game outcome including a first plurality of feature game symbols. The instructions may further cause the at least one processor to, in response to the first feature game outcome including an interval symbol, cause the interval display element to indicate a second interval of the plurality of intervals. The instructions may further cause the at least one processor to, when the interval display element indicates the second interval, select a second tier of lookup tables corresponding to the second interval. The instructions may further cause the at least one processor to evaluate an RNG call outcome based on the second tier of lookup tables to determine a second feature game outcome. The instructions may further cause the at least one processor to cause the at least one display device to display the second feature game outcome, the second feature game outcome including a second plurality of feature game symbols.

In another aspect, a method for providing interval triggers in an electronic game may be provided. The method may be performed by at least one processor in communication with at least one memory device and at least one display device. The method may include causing the at least one display device to display a user interface associated with a feature game, the user interface including an interval display element indicating a first interval of a plurality of intervals. The method may further include, when the interval display element indicates the first interval, selecting a first tier of lookup tables corresponding to the first interval. The method may further include evaluating an RNG call outcome based on the first tier of lookup tables to determine a first feature game outcome. The method may further include causing the at least one display device to display the first feature game outcome, the first feature game outcome including a first plurality of feature game symbols. The method may further include, in response to the first feature game outcome including an interval symbol, causing the interval display element to indicate a second interval of the plurality of intervals. The method may further include, when the interval display element indicates the second interval, selecting a second tier of lookup tables corresponding to the second interval. The method may further include evaluating an RNG call outcome based on the second tier of lookup tables to determine a second feature game outcome. The method may further include causing the at least one display device to display the second feature game outcome, the second feature game outcome including a second plurality of feature game symbols.

In another aspect, a non-transitory computer-readable storage media having computer-executable instructions embodied thereon may be provided. When executed by at least one processor in communication with at least one memory device and at least one display device, the computer-executable instructions cause the at least one processor to cause the at least one display device to display a user interface associated with a feature game, the user interface including an interval display element indicating a first interval of a plurality of intervals. The computer-executable instructions may further cause the at least one processor to, when the interval display element indicates the first interval, select a first tier of lookup tables corresponding to the first interval. The computer-executable instructions may further cause the at least one processor to evaluate an RNG call outcome based on the first tier of lookup tables to determine a first feature game outcome. The computer-executable instructions may further cause the at least one processor to cause the at least one display device to display the first feature game outcome, the first feature game outcome including a first plurality of feature game symbols. The computer-executable instructions may further cause the at least one processor to, in response to the first feature game outcome including an interval symbol, cause the interval display element to indicate a second interval of the plurality of intervals. The computer-executable instructions may further cause the at least one processor to, when the interval display element indicates the second interval, select a second tier of lookup tables corresponding to the second interval. The computer-executable instructions may further cause the at least one processor to evaluate an RNG call outcome based on the second tier of lookup tables to determine a second feature game outcome. The computer-executable instructions may further cause the at least one processor to cause the at least one display device to display the second feature game outcome, the second feature game outcome including a second plurality of feature game symbols.

DETAILED DESCRIPTION

Figure 1:
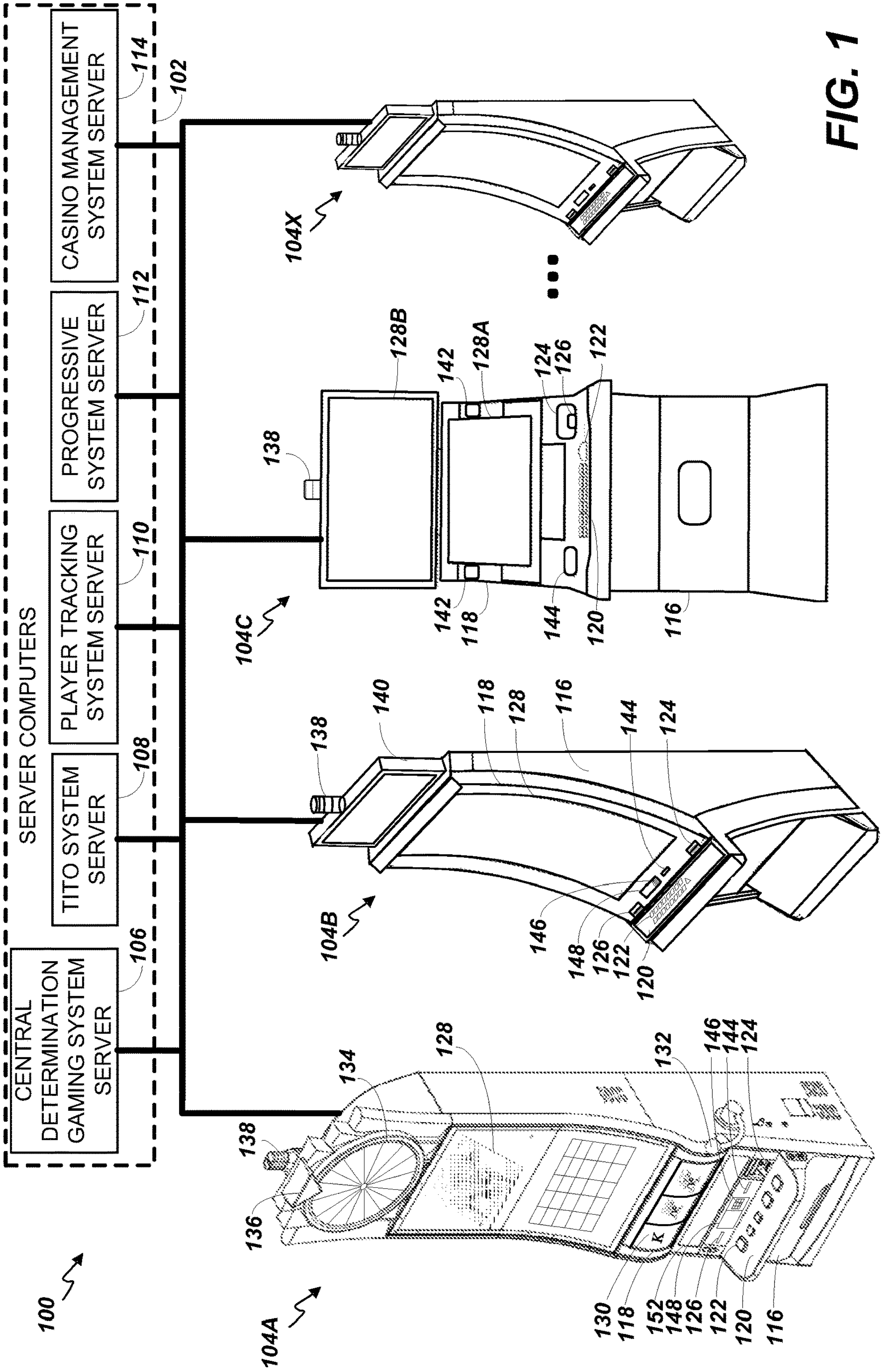
FIG. 1 is an exemplary diagram showing several EGMs networked with various gaming related servers.

The present application is directed to electronic gaming or electronic game play, and more specifically, to computer based electronic gaming or game systems and methods for providing interval triggers and tiered awards. For example, interval triggers and tiered awards may be applied to RNG based games (e.g., Class III slot games), as described elsewhere herein. A feature game may include a plurality of predefined states, or "intervals" (e.g., a first, second, third, and fourth interval), through which the feature game may progress in response to an interval trigger (e.g., an appearance of a particular symbol during a game instance). In other words, when the feature game is in a given interval, and an interval trigger occurs, the feature game may progress to a subsequent interval in response. Each interval may be associated with a respective tier of lookup tables that are used to determine outcomes (referred to herein as "feature game outcomes") of game instances (e.g., display patterns and/or prizes to award based on an RNG call). Accordingly, the chances of receiving a certain award (e.g., a credit value and/or multiplier) may vary depending on the current game interval. For example, in some embodiments, the possible awards may increase as the feature game advances to further intervals.

A user interface of the game display may include an interval display element that indicates the current game interval. To make the game interval concept more easily understandable to a user, the feature game and the game intervals may be thematically tied to another game or sport. For example, the feature game may have a football theme, and the game intervals may correspond to quarters of the football game (e.g., the first game interval may correspond to the first quarter, and so on).

In the example embodiment, a base game may be provided. In the base game, a base game outcome may be determined (e.g., by evaluating a lookup table with respect to an RNG call). The base game outcome may include symbols displayed on reels, wherein each reel is configured to spin (e.g., mechanically or virtually). The base game outcome may include a prize symbol (e.g., a symbol, otherwise known as a "cash on reel" symbol, that themselves include display of a credit value and/or respective output amount or prize to be provided). The prize symbol may include a credit award, a jackpot award, and/or a multiplier. During the base game, if a base game outcome for a given game instance or spin does not include a prize symbol, a free additional spin (or "respin") may be awarded.

The base game outcome may further include a bonus symbol, which when present, triggers a bonus game. In some embodiments, the bonus game may include a wheel spin mechanic, in which a physical (e.g., electromechanical) and/or virtual (e.g., video) wheel is spun, and the final position of the wheel indicates an outcome of the bonus game. The final position of the wheel may be determined, for example, based on an RNG call. The bonus game outcome may include symbols and/or awards displayed on the wheel that are located, at the completion of the wheel spin, in a certain position. The bonus game outcome may include a credit award, a jackpot award, a multiplier, and/or a feature symbol, which may trigger the feature game.

In the exemplary embodiment, a feature game outcome of the feature game may include symbols displayed on, for example, virtual reels that are configured to spin virtually. The symbols included in the feature game outcome may include symbols corresponding to, for example, a credit award, a jackpot award, and/or a multiplier. As described above, the feature game may include a plurality of intervals and the feature game outcome for a given game instance may depend on the current interval, in that the value of the credit award, the jackpot award, and/or the multiplier may depend (e.g., be increased or decreased) on lookup tables that are selected based on the current interval, and accordingly may change for subsequent game instances as the feature game progresses through different intervals. In the example embodiment, multiple intervals may be available, including, but not limited to, a first interval, a second interval, a third interval, and/or a fourth interval. Each interval may be associated with a respective tier of lookup tables. The award values (e.g., the values of the credit award, the jackpot award, and/or the multiplier) of the prize symbols that may be displayed for a given game instance may increase as the interval, and corresponding tier of lookup tables, advances respectively from the first interval to the fourth interval and from the first tier of lookup tables to the fourth tier of lookup tables. Each tier of lookup tables may be associated with an increased chance of greater awards as the tier of lookup tables advances from a lower tier to a higher tier. For each spin of the virtual reels in the feature game, a lookup table from the tier of lookup tables corresponding to the current interval may be applied based on an RNG output.

During the feature game, the feature game outcome may include a trigger that causes the feature game to advance to the next interval. For example, the feature game outcome may include an interval symbol that triggers an advancement of the interval, such as from a lower interval to a higher interval. The advancement of the interval may be based on a second RNG output and may include an advancement of an interval display element to a subsequent interval based on the second RNG output. The feature game may terminate upon completion of the final (e.g., fourth) interval, for example, when an interval symbol is displayed during the fourth interval.

In some embodiments, the feature game outcome may include an extra interval symbol to trigger an extra interval. The extra interval may be triggered during the final (e.g., fourth) interval, for example, in response to the extra interval symbol being displayed. The extra interval may be associated with one or more additional lookup tables that correspond to awards (e.g., credit awards, jackpot awards, and/or multipliers) of increased value as compared to the awards that may be displayed and/or awarded during the previous intervals. The feature game may terminate following the end of the extra interval.

In some examples, the intervals of the feature game may be associated with a time interval of a sporting event, such as a "quarter" of a football game. The interval advancement from the first interval to the fourth interval may be displayed as the advancement from the "first quarter" to the "fourth quarter" of a football game. As the football game advances from the first quarter to the fourth quarter, the prize symbols may display awards of increasing value, such that increased credit awards, jackpot awards, and/or multipliers are available "later" in the football game during subsequent intervals (e.g., quarters). During each quarter, the feature game outcome may include the interval symbol, which may be displayed as a symbol denoting the subsequent quarter of the football game to trigger the end of the current quarter and the advancement to the subsequent quarter. For example, during the first quarter, the interval symbol may be displayed as a symbol denoting the second quarter to trigger the end of the first quarter and the advancement to the second quarter. Additionally, during the fourth quarter, the extra interval symbol may be displayed as a symbol denoting an extra play interval of "overtime" of the football game. During the extra play interval of overtime, the prize symbols may display awards of further increased value as compared to the regular play intervals of the football game (e.g., the first through the fourth quarters) and/or a multiplier to be applied to a sum of the award values awarded during all of the regular play intervals of the football game. In other example, other themes, such as other games or sports, may be used. For example, the intervals and extra interval may correspond respectively to the three periods and overtime of an ice hockey game, or to the nine innings and extra innings of a baseball game.

Certain technical problems arise when implementing electronic gaming systems and methods for providing interval triggers and tiered awards. Utilizing multiple different tiers of lookup tables enables the feature game to have a greater variability of game outcomes while including control functions to implement the feature game while complying with gaming regulations, such as achieving a designated game RTP or volatility. For example, one tier of lookup tables (e.g., associated with a lower interval) may be associated with lower prizes but a greater chance of awarding a prize, while another tier of lookup tables (e.g., associated with a higher interval) may be associated with higher prizes but a lower chance of awarding a prize, thus providing variability while still maintaining a designated RTP or volatility for each interval.

One technical problem present in a feature game including multiple different tiers of lookup tables is that computing resources and memory must be utilized in order to select a tier of lookup tables for use in a given game instance. The system described herein solves this technical problem using interval triggers and tiered awards, specifically, by indexing the tiers of lookup tables in the memory to the different intervals and performing a lookup based on a current interval (e.g., defined by a state indicator stored in the memory) to select a tier of lookup tables to use for a given game instance. This state or interval may be updated in response to a predefined trigger, such as an occurrence of a certain symbol within a feature game outcome. This indexing improves an efficiency of using computing and memory resources when implementing a feature game that utilizes multiple tiers of pay tables.

One technical problem present in a feature game including multiple different tiers of lookup tables is indicating, within a user interface, the current state or interval of the game to the user. Generally, it is desirable that indicators are easy to understand and make efficient use of a display space (e.g., a smaller footprint) while still conveying information in an easy to understand manner. The system described herein solves this technical problem by including an interval display element that indicates the current interval. The interval display element may be themed with a concept familiar to potential users (e.g., quarters of a football game), thus making the interval concept easy to understand for users who may initially be unfamiliar with the interval mechanic of the feature game and reducing a need to dedicate additional space within the user interface for explanation of the intervals.

Accordingly, technical solutions are described herein to address at least the technical problems described above. Interval triggers and tiered awards may provide multiple successive segments of free spins, with the prizes increased in each segment, followed by a possible award of an additional segment with further increased prizes. Technical solutions represented by the present disclosure include at least: (i) generating and causing display of an electronic game that may randomly advance a feature game through a plurality of intervals to improve award probability; (ii) generating and causing display of an electronic game that may provide improved award probability by using multiple lookup tables and/or reel sets from which to draw and display increasing credit and/or jackpot awards; (iii) improving variability of an electronic game while maintaining a designated RTP by utilizing multiple different tiers of lookup tables to evaluate game instances that are selected based on a current state or interval of the game; (iv) increasing efficiency of use of memory and computer resources by an electronic game that uses multiple tiers of lookup tables by indexing the multiple of tiers of lookup tables with respective intervals or states based on which of the tiers of lookup tables may be selected; (v) reducing a footprint of an indicator of a current interval of an electronic game displayed on a user interface by including an interval display element within the user interface that is selected based on a theme of the electronic game, such that the intervals may be indicated by a concept already familiar to users (e.g., quarters of a football game); and (vi) increasing understandability of an indicator of a current interval of an electronic game displayed on a user interface by including an interval display element within the user interface that is selected based on a theme of the electronic game, such that the intervals may be indicated by a concept already familiar to users.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the feature game. Bonus topper wheel 134 is typically used to play a feature game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
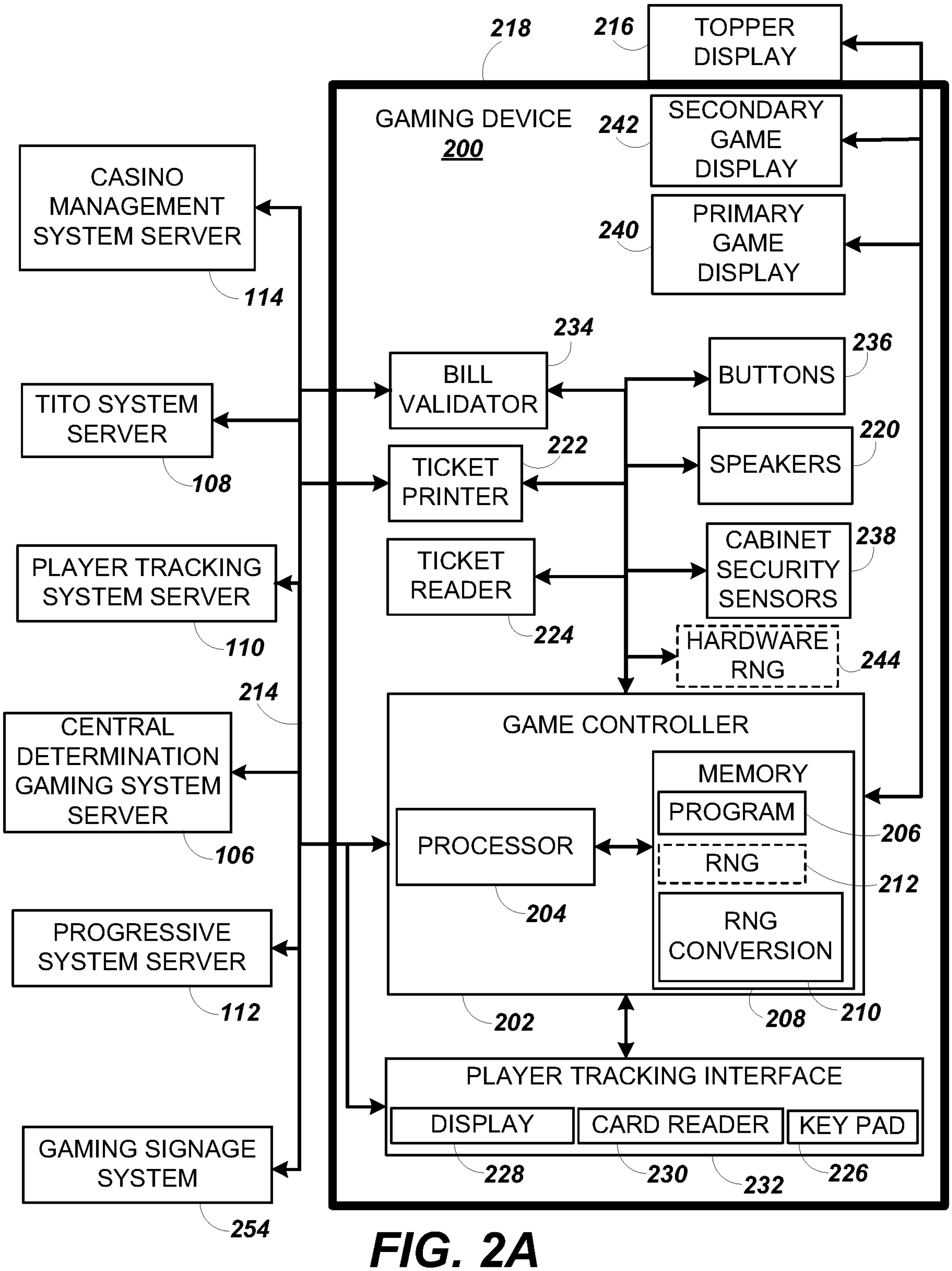
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for feature game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, feature games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or feature games; bonus introduced game elements such as extra reels, bonus symbols, or bonus cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a bonus game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
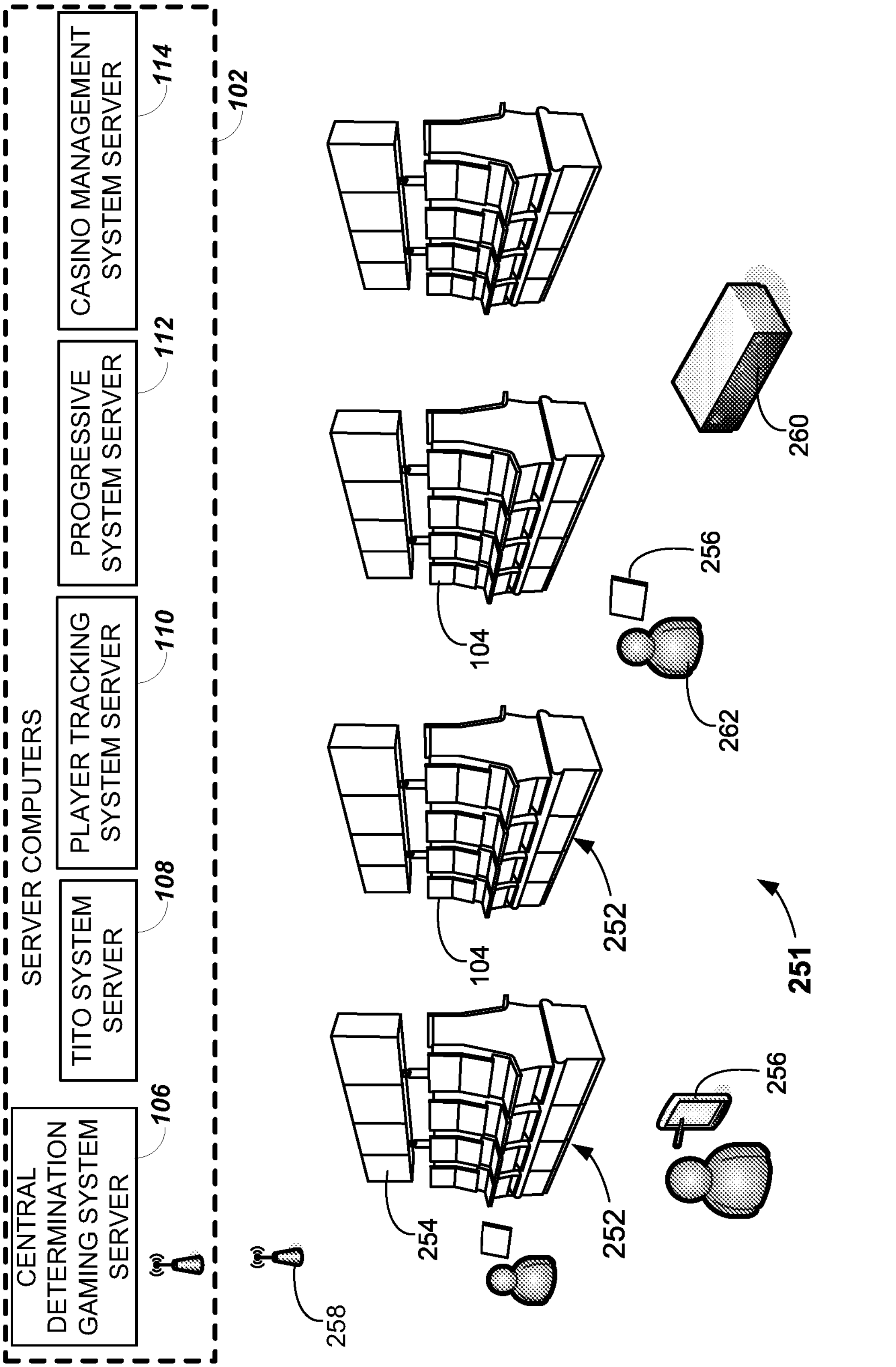
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
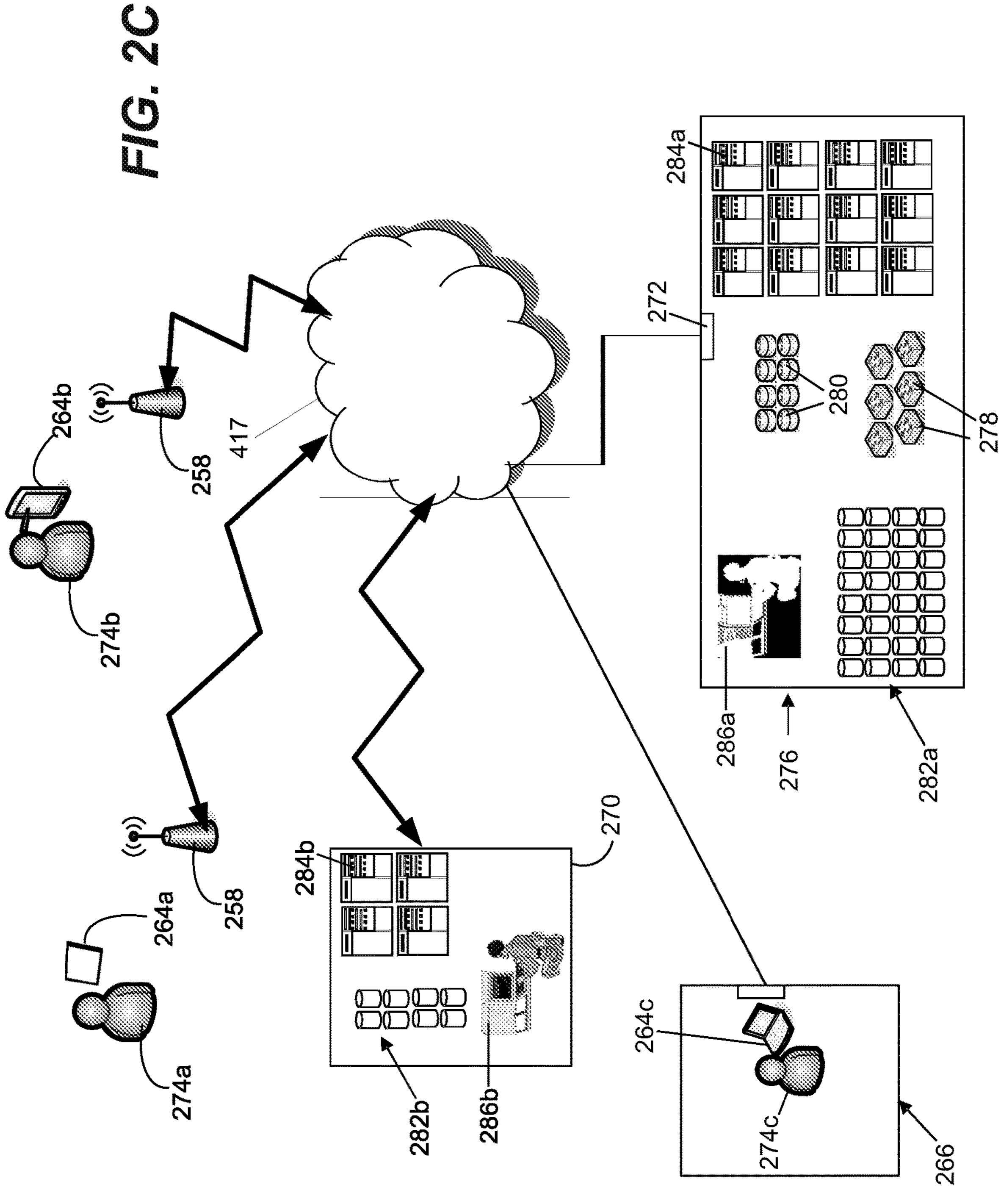
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser.

Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
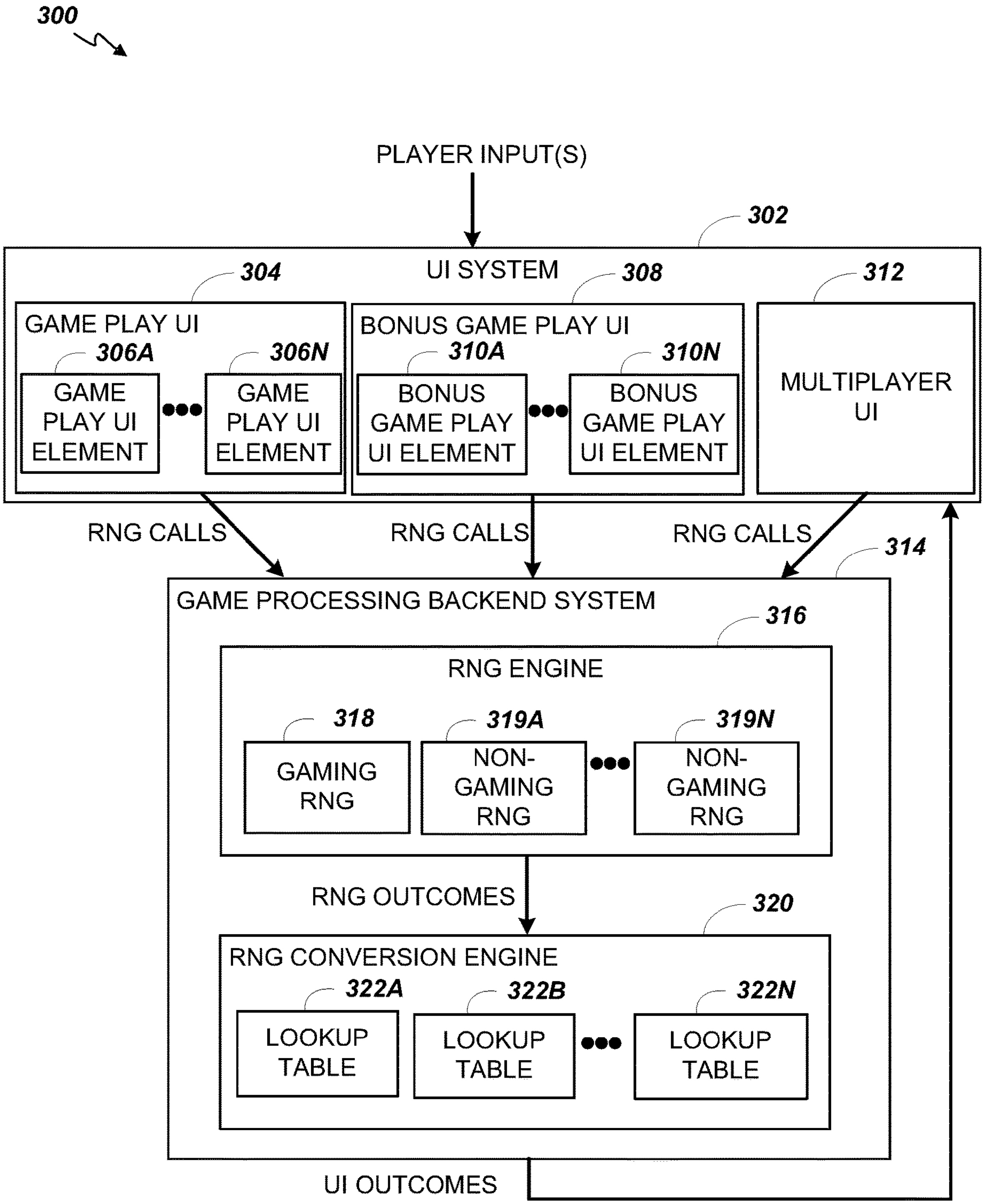
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more feature game play UIs 308, and one or more multiplayer UIs 312, where each UI type includes one or more mechanical UIs and/or graphical UIs (GUIs). In other words, game play UI 304, feature game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and feature game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more feature games. The feature game play UI 308 represents a UI that utilizes feature game play UI elements 310A-310N for a player to interact with and/or view during a feature game. In one or more implementations, at least some of the game play UI element 306A-306N are similar to the feature game play UI elements 310A-310N. In other implementations, the game play UI element 306A-306N can differ from the feature game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a feature game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a feature game, the UI system could update one or more feature game play UI elements 310A-310N (e.g., symbols) for the feature game play UI 308. In response to updating the appropriate UI, the player may subsequently provide additional player inputs to initiate a subsequent game instance that progresses through the game processing pipeline.

Figure 4:
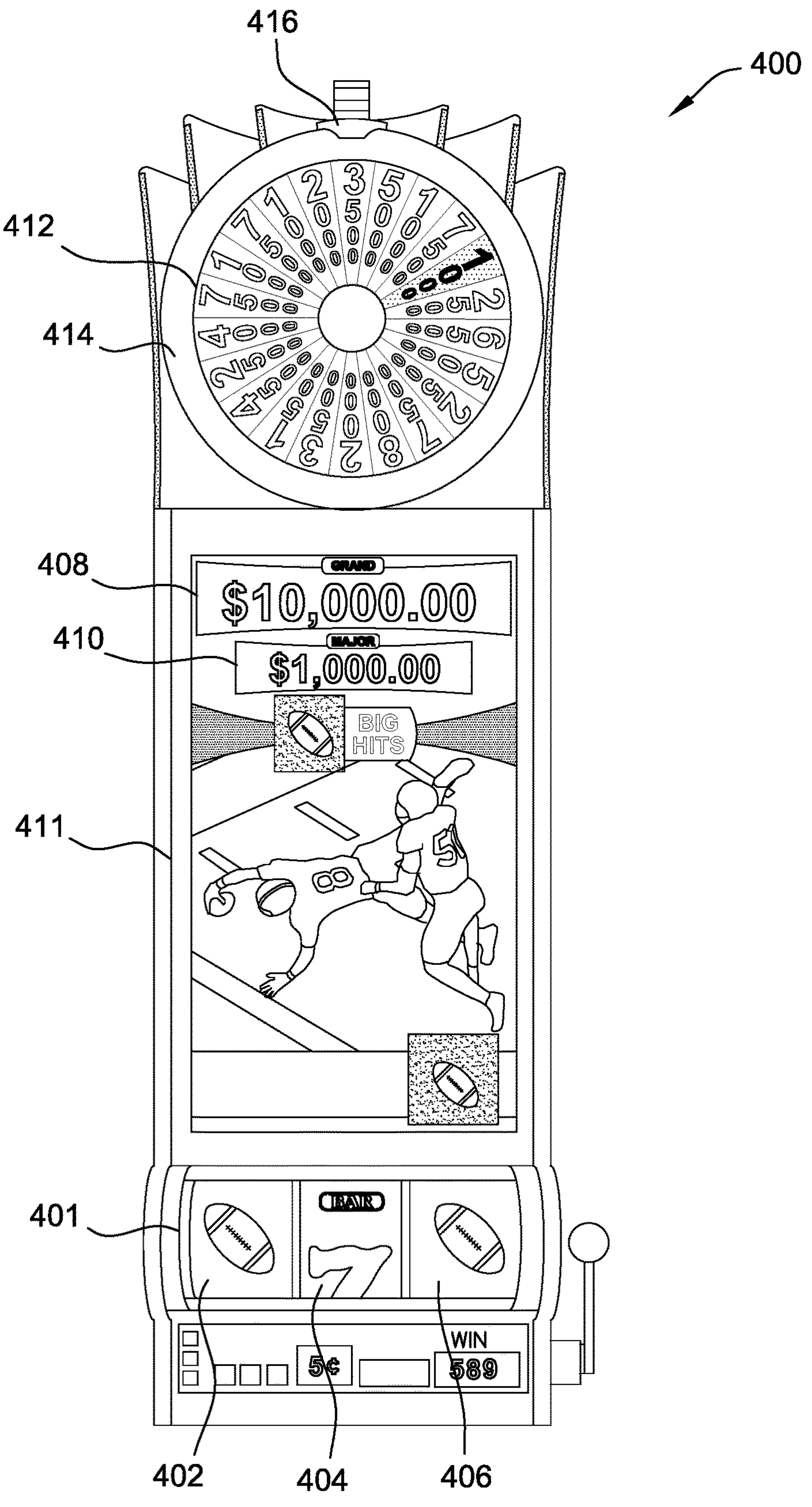
FIG. 4 is a front view of an EGM with multiple display areas.
Figure 5:
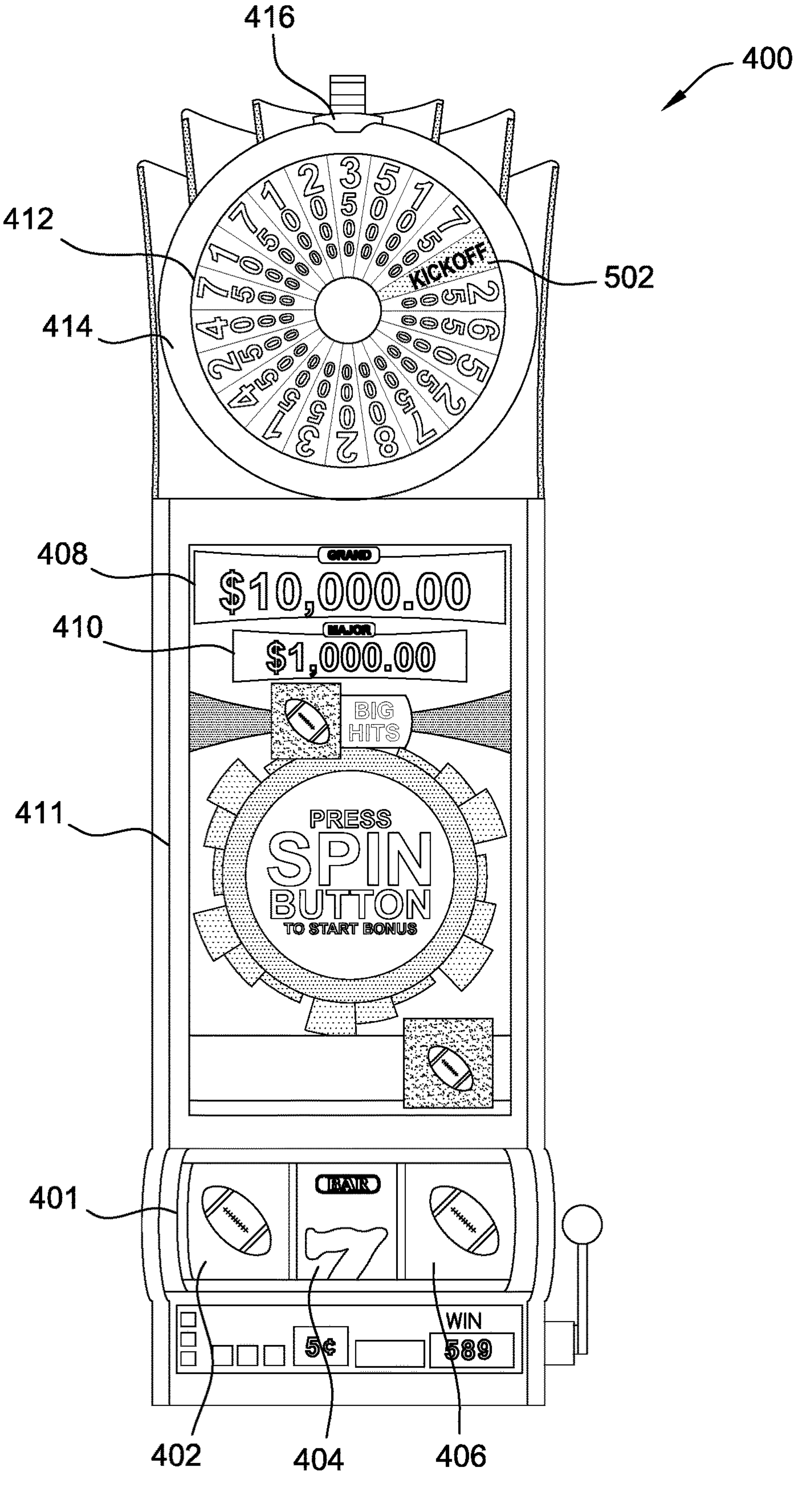
FIG. 5 is another front view of the EGM shown in FIG. 4.

FIGS. 4-5 are front views of an EGM 400 with multiple display areas. In the example of FIGS. 4-5, a plurality of reels 402-406 are displayed in a first display area 401 of a gaming device (e.g., gaming devices 104A-104X, 256, and/or 264*a*-264*c*) by a game controller (e.g., game controller 202). While three reels 402-406 are shown in the example of FIG. 4, in some examples, more or fewer reels may be used. In some examples, reels 402-406 may be implemented as mechanical reels or may include virtual reels that are computer generated and displayed on a computer display screen/display device. As shown, each reel of reels 402-406 includes a plurality of symbol display positions for presenting symbols (and/or symbol combinations) which may be associated with winning and/or losing reel game outcomes and/or awards.

Game controller 202 (shown in FIG. 2A) may cause to be displayed a plurality of jackpot meters 408-410 (e.g., jackpots displaying a jackpot value) in a second display area 411, including a grand jackpot meter 408 and a major jackpot meter 410. Additionally, game controller 202 may cause to be displayed a wheel 412 in a third display area 414. In some examples, wheel 412 may be implemented as a mechanical wheel or may include a virtual wheel that is computer generated and displayed on a computer display screen/display device. As shown, wheel 412 includes a plurality of stop positions and a pointer 416 to indicate a wheel stop position at one of the plurality of stop positions after a wheel spin is completed. Each of the plurality of stop positions may display a prize, such as, but not limited to, a credit prize and/or a jackpot prize associated with one of jackpot meters 408-410.

In operation, game controller 202 (shown in FIG. 2A) may cause to be displayed a base game outcome including a plurality of symbols on reels 402-406. The plurality of symbols may include a prize symbol (not shown in figures). The prize symbol may include a prize, including, but not limited to, a credit prize and/or a jackpot prize associated with one of jackpot meters 408-410. In the examples of FIGS. 4-5, the base game has a football theme. Prior to initiation of the base game, a selection of a football team may be presented to a user and the selected football team may be used in the displays throughout the base game.

During the base game, if a base game outcome is a non-winning outcome (e.g., does not include a winning reel symbol combination), an additional spin, or respin, of reels 402-406 may be performed. In cases where a first respin does not result in a winning spin (e.g., a winning reel symbol combination), one or more additional respins may be performed until a winning spin occurs. In some examples, the respin of reels 402-406 may be themed as an "interception" of a football game. The respin of reels 402-406 may be triggered by a non-winning base game outcome (e.g., a base game outcome that does not include a winning reel symbol combination) and/or by a combination of a non-winning base game outcome and an evaluation of a respin lookup table. For example, an RNG call may be performed (e.g., in response to a non-winning base game outcome) and evaluated using the respin lookup table, and one or more respins may be presented based on the evaluation. During a spin of reels 402-406, while reels 402-406 are spinning, an anticipation feature (not shown in figures) may be activated to cause the reels 402-406 to spin longer than usual. In some examples, the anticipation feature may be themed as a "big play" of a football game, such as a "Hail Mary" pass, and may include an associated football animation displayed in second display area 411.

The plurality of symbols that may be displayed on reels 402-406 may also include a bonus symbol (not shown in figures). The bonus symbol may appear as a wheel or another symbol different from others that may be displayed on reels 402-406 during the base game. The display of one or more of the bonus symbol during the base game may cause game controller 202 to initiate a bonus game. As shown in FIG. 5, the initiation of the bonus game may include a graphic displayed in second display area 411 to show a spin button to start the bonus game by spinning wheel 412. In some examples, second display area 411 may be configured for touch input, in that a user may touch (e.g., press) the spin button shown in second display area 411 to spin wheel 412. The bonus game may include a number of spins of wheel 412. In operation, during game play of the bonus game, each spin of wheel 412 may cause the prize (e.g., the credit prize and/or the jackpot prize) aligned with pointer 416 upon completion of the spin of wheel 412 to be awarded. The plurality of stop positions of wheel 412 may also display a feature symbol 502, as shown in FIG. 5. In the example of FIG. 5, feature symbol 502 is displayed to appear as the start, or "kickoff," of a football game. In some examples, feature symbol 502 may have an alternative appearance. A spin of wheel 412 that aligns the pointer 416 with feature symbol 502 upon completion of the spin may cause game controller 202 to initiate a feature game. In some examples, the bonus game may include an alternative bonus game element instead of wheel 412.

FIGS. 6A-6D illustrate an example user interface or screenshot 600 of a feature game of an example electronic game played on an EGM similar to the one shown in FIG. 4. In the example shown in FIGS. 6A-6D, virtual reels 602-606 are displayed in second display area 411 of the gaming device (e.g., gaming devices 104A-104X, 256, and/or 264*a*-264*c*) by the game controller (e.g., game controller 202). While three virtual reels 602-606 are shown in the example of FIGS. 6A-6D, in some examples, more or fewer reels may be used. Virtual reels 602-606 may be computer generated and displayed on a computer display screen/display device. As shown, each virtual reel of virtual reels 602-606 includes a plurality of symbol display positions for presenting symbols (and/or symbol combinations) which may be associated with winning and/or losing reel game outcomes and/or awards.

Game controller 202 (shown in FIG. 2A) may cause to be displayed a feature game outcome including a second plurality of symbols on virtual reels 6A-6D. The second plurality of symbols may include a feature prize symbol 608. Feature prize symbol 608 may include a prize, including, but not limited to, a credit prize and/or a jackpot prize associated with one of jackpot meters 408-410. Game controller 202 may cause the prize of feature prize symbol 608 to be awarded if feature prize symbol 608 lands on a payline, e.g., the "center line" across the middle of virtual reels 602-606. The center line may be denoted by two "pointers" on the sides of virtual reels 602-606, as shown in FIGS. 6A-6D. In the example of FIGS. 6A-6D the credit prize of 5000 credits is awarded due to feature prize symbol 608 displaying '5000' landing on the center line. In some examples, a credit prize may be awarded that equals a value as displayed by the numbers on the center line across virtual reels 602-606. For example, if two of feature prize symbol 608 landed on the center line, one on reel 602 displaying a prize of '20' credits and the other on reel 604 displaying a prize of '50' credits, a credit prize of '2050' may be awarded.

The second plurality of symbols may also include a multiplier symbol 609 (shown in FIG. 6C) that includes a multiplier (such as ×2). Game controller 202 may cause the prize award of feature prize symbol 608 that landed on the center line across virtual reels 602-606 to be multiplied by the multiplier if the multiplier also lands on the center line. In some examples, the multiplier symbol may be displayed as a "touchdown" of a football game.

Figure 6A:
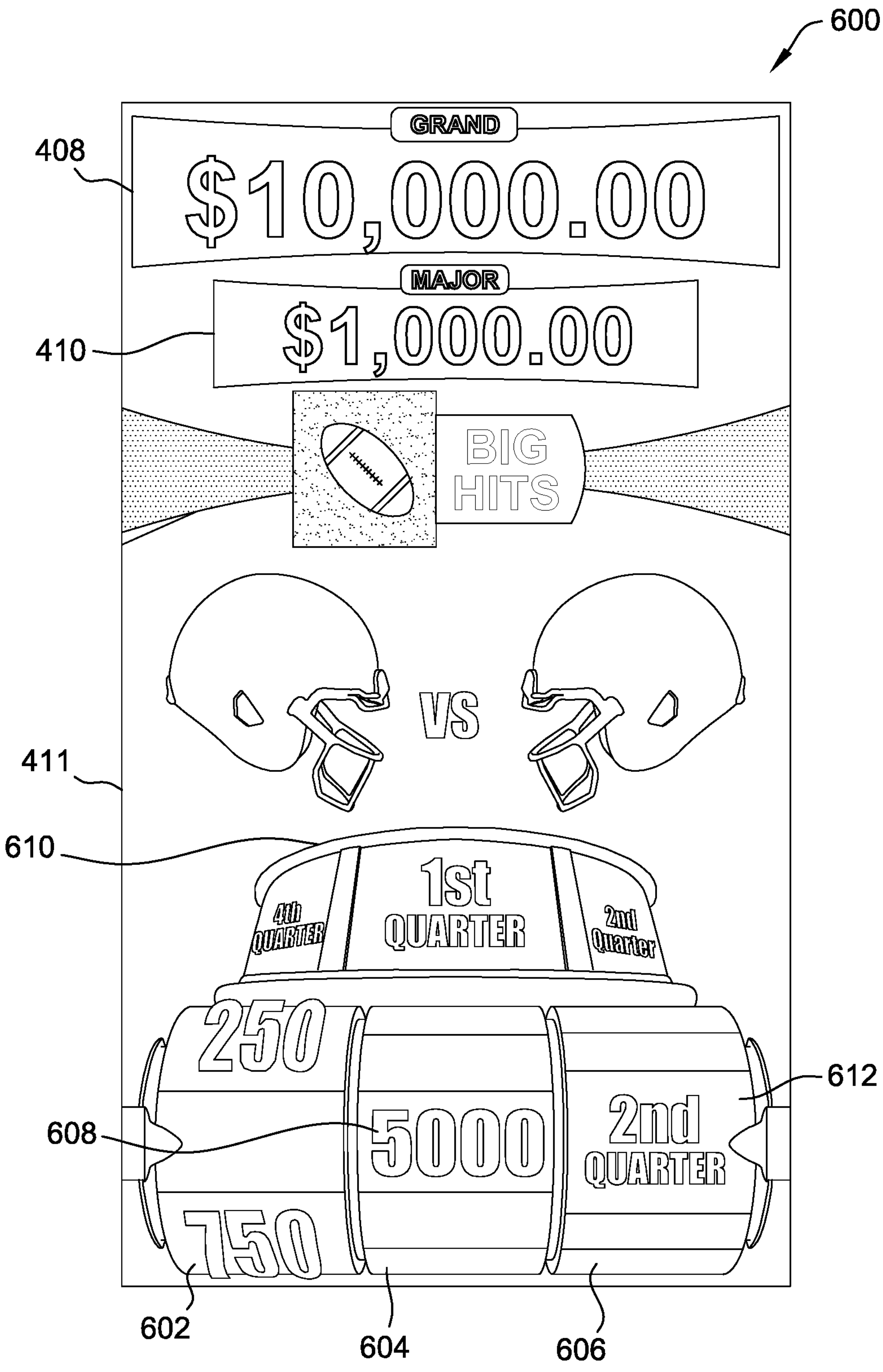
FIG. 6A is an example user interface a feature game of an example electronic game played on an EGM similar to the one shown in FIG. 4.
Figure 6B:
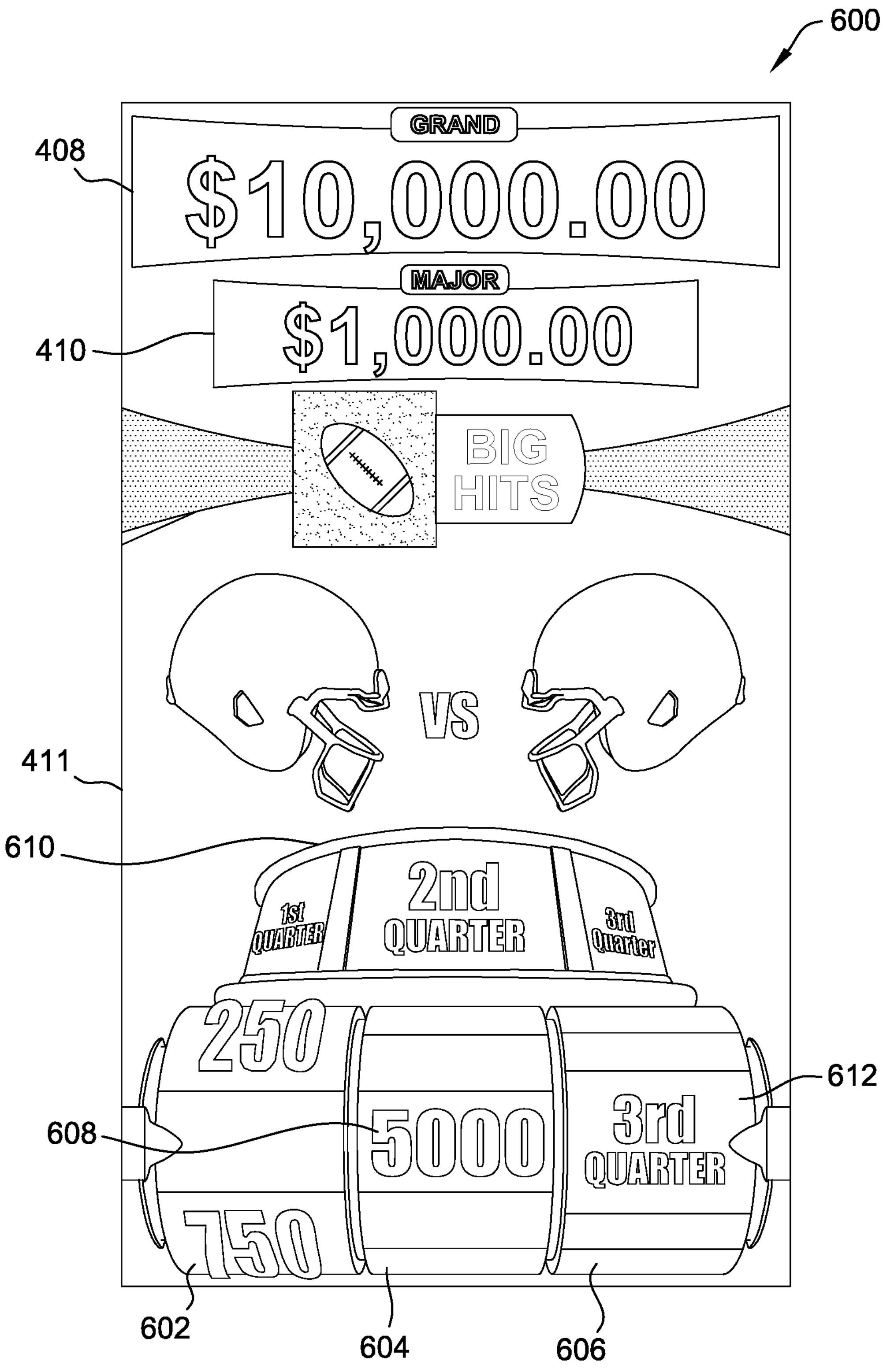
FIG. 6B is another example user interface of the feature game shown in FIG. 6A.
Figure 6C:
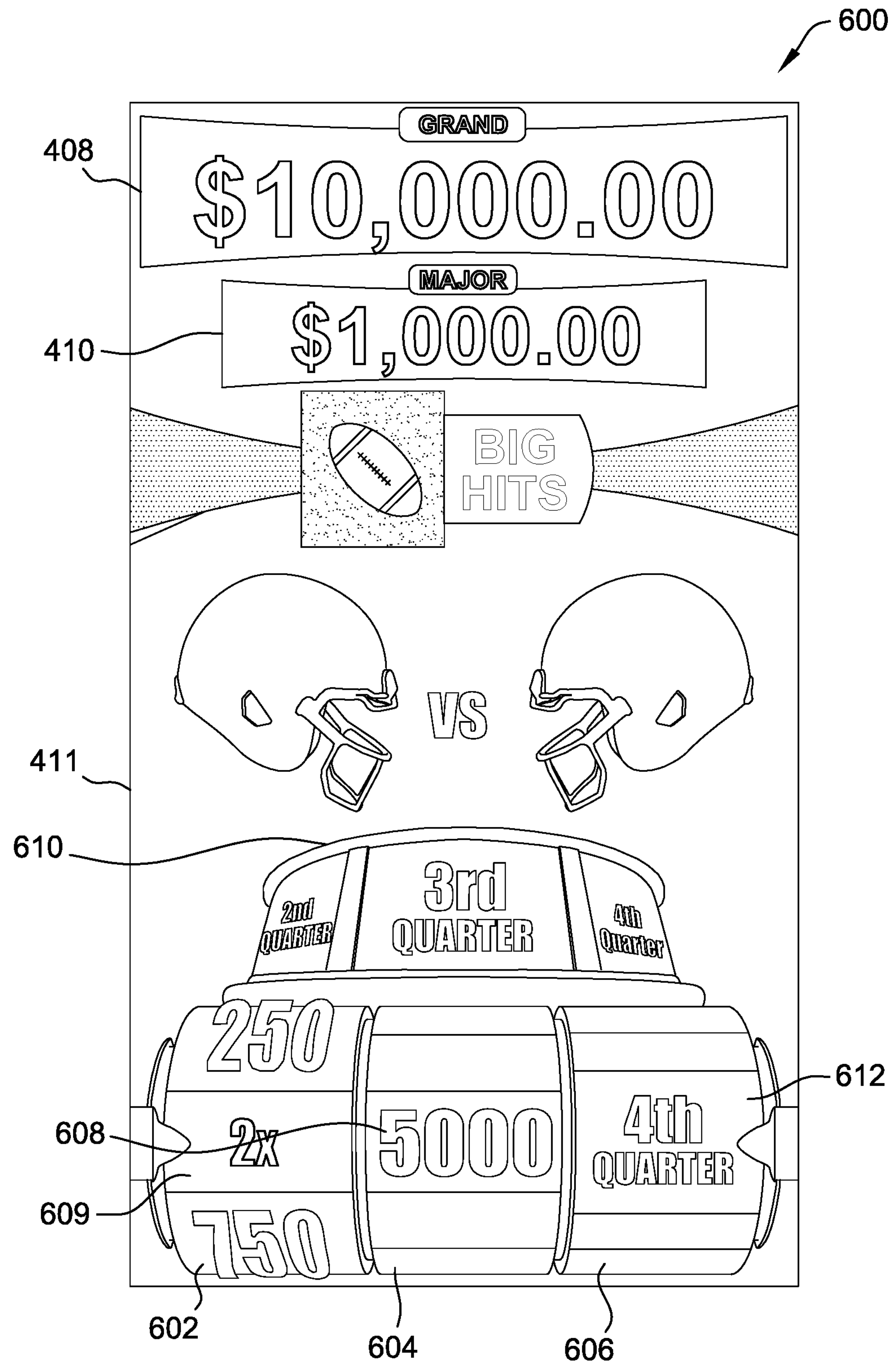
FIG. 6C is another example user interface of the feature game shown in FIGS. 6A and 6B.
Figure 6D:
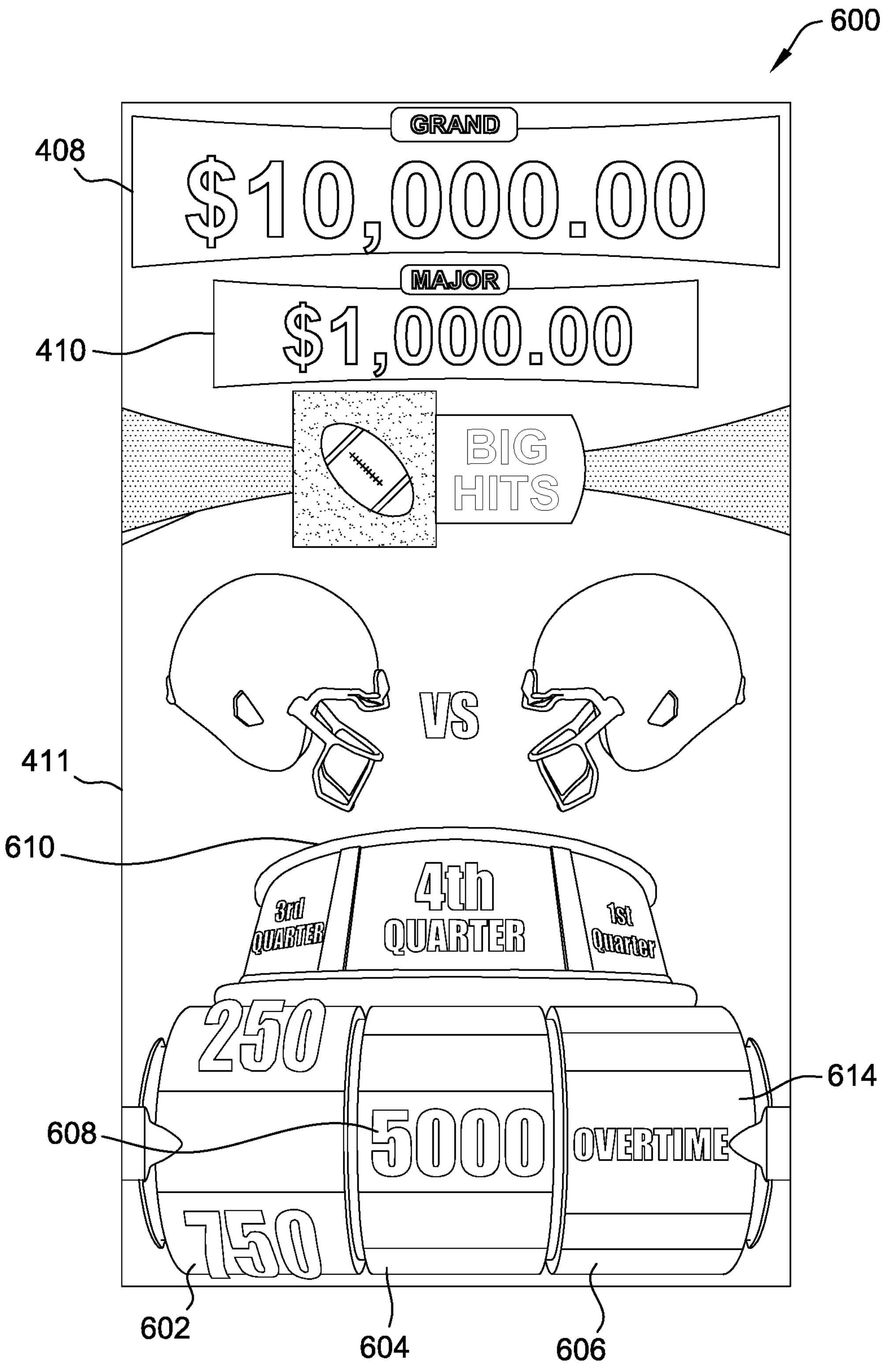
FIG. 6D is another example user interface of the feature game shown in FIGS. 6A, 6B, and 6C.

In operation, the feature game may be comprised of a plurality of intervals, including, but not limited to, a first interval, a second interval, a third interval, and a fourth interval. The feature game outcome may depend on the current interval, in that the displayed symbols of the second plurality of symbols and/or the prizes displayed on feature prize symbol 608 may vary based on the interval. In the example of FIGS. 6A-6D, the feature game has a football theme, in that the plurality of intervals are associated with time intervals (e.g., quarters) of a football game. For example, the first interval may be associated with a first quarter (shown in FIG. 6A), the second interval may be associated with a second quarter (as shown in FIG. 6B), the third interval may be associated with a third quarter (as shown in FIG. 6C), and the fourth interval may be associated with a fourth quarter (as shown in FIG. 6D). Each interval may be associated with a tier of lookup tables. As the feature game continues, the interval may advance, making it appear that a football game is advancing through time intervals from the first to the fourth quarter. As the interval advances, the tier of lookup tables may also advance to provide an increased chance of greater awards, in that the higher tiers of lookup tables may include greater prize values to be displayed on feature prize symbol 608.

Game controller 202 may cause to be displayed an interval display element 610 to display the current interval. For example, as shown in FIG. 6A, interval display element 610 indicates that it is the first quarter. As the interval advances, interval display element 610 may rotate (e.g., to the left) to indicate that it is the second quarter, as shown in FIG. 6B. Likewise, interval display element 610 may further rotate to indicate when it is the third quarter (as shown in FIG. 6C) and the fourth quarter (as shown in FIG. 6D). The indicia shown on interval display element 610 may be different depending on, for example, the theme of the game that is being displayed. For example, interval display element 610 may rotate to indicate three periods (corresponding to three intervals) in an ice hockey-themed game, or nine innings (corresponding to nine intervals) in a baseball-themed game.

An interval continues for spins of virtual reels 602-606 until an interval symbol 612 denoting a subsequent interval is displayed. During an interval, for each spin of virtual reels 602-606, game controller 202 may cause the evaluation of the corresponding tier of lookup tables to display a prize on feature prize symbol 608. An RNG output (not shown in figures) may determine a lookup table of the tier of lookup tables from which to pull the prize to be displayed on feature prize symbol 608. Additionally, a second RNG output (not shown in figures) may determine a number of spins of virtual reels 602-606 after which to advance the interval as displayed on interval display element 610.

In the example of FIG. 6A, the first interval may be displayed on interval display element 610, associated with the first quarter of a football game. The first interval may continue for spins of virtual reels 602-606 until interval symbol 612 denoting the subsequent interval, the second interval, is displayed. In the example of FIG. 6A, interval symbol 612 denoting the subsequent interval, the second interval associated with the second quarter of a football game, is displayed.

Similarly, as shown in FIG. 6B, the second interval may be displayed on interval display element 610, associated with the second quarter of a football game. The second interval may continue for spins of virtual reels 602-606 until interval symbol 612 denoting the subsequent interval, the third interval, is displayed. In the example of FIG. 6B, interval symbol 612 denoting the subsequent interval, the third interval associated with the third quarter of a football game, is displayed.

Likewise, as shown in FIG. 6C, the third interval may be displayed on interval display element 610, associated with the third quarter of a football game. The third interval may continue for spins of virtual reels 602-606 until interval symbol 612 denoting the subsequent interval, the fourth interval, is displayed. In the example of FIG. 6C, interval symbol 612 denoting the subsequent interval, the fourth interval associated with the fourth quarter of a football game, is displayed.

Similarly, as shown FIG. 6D, the fourth interval may be displayed on interval display element 610, associated with the fourth quarter of a football game. The fourth interval may continue for spins of virtual reels 602-606 until an extra interval symbol 614 (described in further detail below) is displayed.

When the interval advances, game controller 202 may cause the evaluation of the corresponding subsequent tier of lookup tables, as the tier of lookup tables advances. For example, the first through the fourth interval may correspond with a first tier of lookup tables through a fourth tier of lookup tables, respectively. As the tier of lookup tables advances, the prizes available to be displayed on feature prize symbol 608 may increase. Additionally, as the tier of lookup tables advances, the appearance of interval symbol 612 may change, in that interval symbol 612 may only denote the subsequent interval. For example, interval symbol 612 may only denote the third interval during the second interval. In some examples, interval symbol 612 may only be displayed on reel 606.

The feature game outcome may include the display of extra interval symbol 614 (shown in FIG. 6D), to trigger an extra interval (not shown in figures) of additional spins of virtual reels 602-606. The extra interval symbol may be displayed to denote "overtime," an extra play interval of a football game. The extra interval symbol 614 may be displayed only on reel 606 during the final (e.g., fourth) interval. During the extra interval, the additional spins of virtual reels 602-606 may display feature prize symbol 608 with prizes (e.g., credit prizes and/or jackpot prizes) of further increased value as compared to the prizes displayed and/or awarded during the previous intervals. The additional spins of virtual reels 602-606 may also display a multiplier to multiply the prizes awarded (e.g., a multiplied sum of the prizes awarded) during one or more of the previous intervals. For example, an awarded prize of 1000 credits during the second interval may be multiplied by two by a 2× multiplier displayed and awarded during the additional spins of virtual reels 602-606 of the extra interval. Additionally, for example, an awarded prize of 2000 credits as a total award that is a sum of all prizes awarded during all previous intervals (e.g., the first through the fourth intervals) may be multiplied by two by a 2× multiplier displayed and awarded during the additional spins of virtual reels 602-606 of the extra interval.

Figure 7:
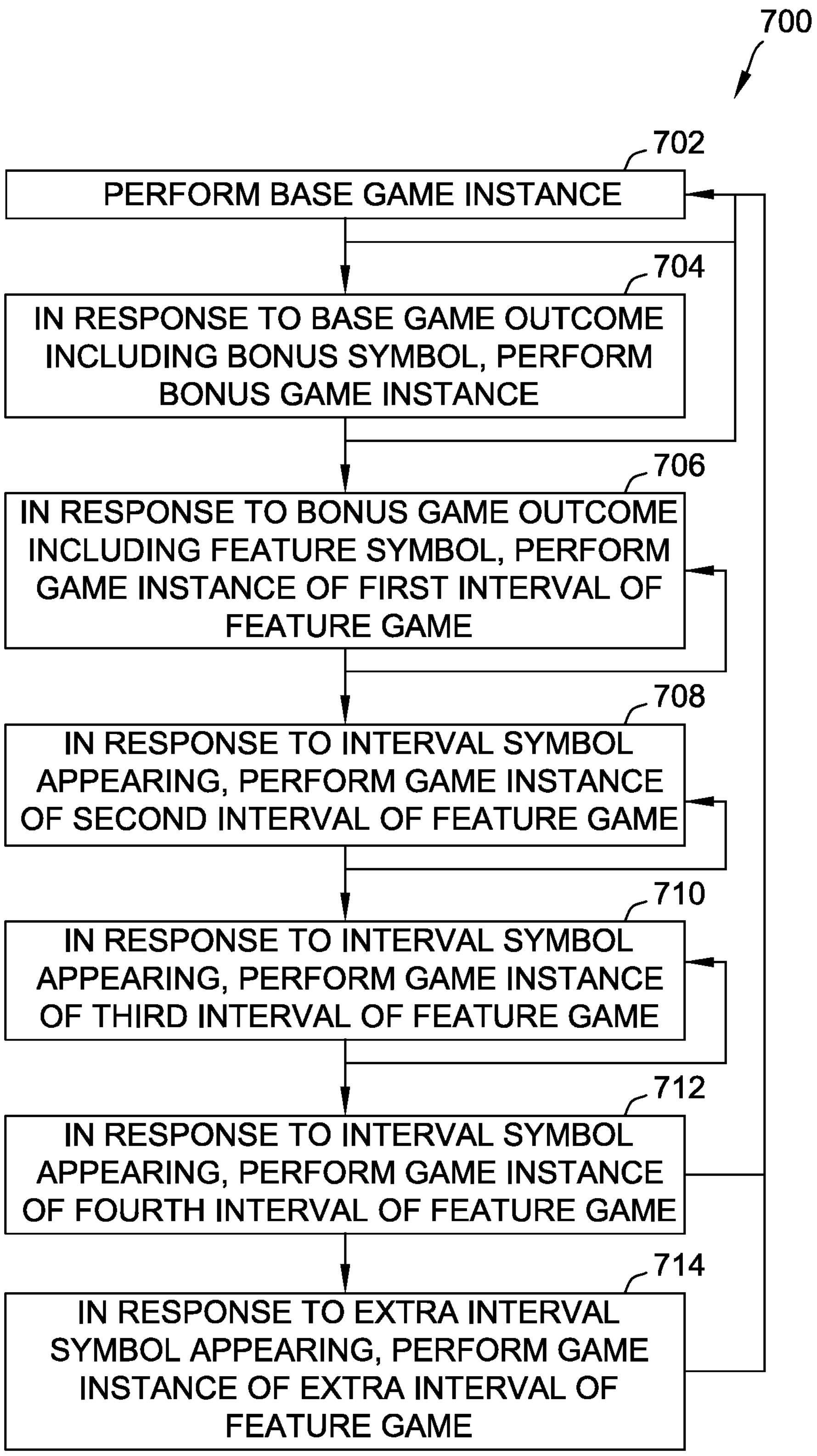
FIG. 7 is a flowchart illustrating an exemplary process for providing interval triggers in an electronic game according to an embodiment of the present disclosure.

FIG. 7 is a flowchart illustrating an exemplary process 700 for providing interval triggers in an electronic game such as the electronic game described with respect to FIGS. 4-6D. Process 700 may include performing 702 a game instance of the base game (e.g., by displaying a reel outcome in display area 401). Process 700 may further include, in response to a base game outcome including a bonus symbol, performing 704 a game instance of the bonus game (e.g., by performing a wheel spin of wheel 412). Process 700 may further include, in response to a bonus game outcome including a feature symbol (e.g., feature symbol 502), proceeding to and performing 706 a feature game instance in the first interval of the feature game. Process 700 may further include, in response to an interval symbol (e.g., interval symbol 612) appearing in an outcome of the feature game while in the first interval, proceeding to and performing 708 a feature game instance in the second interval of the feature game. Process 700 may further include, in response to an interval symbol (e.g., interval symbol 612) appearing in an outcome of the feature game while in the second interval, proceeding to and performing 710 a feature game instance in the third interval of the feature game. Process 700 may further include, in response to an interval symbol (e.g., interval symbol 612) appearing in an outcome of the feature game while in the third interval, proceeding to and performing 712 a feature game instance in the fourth interval of the feature game. Process 700 may further include, in response to an extra interval symbol (e.g., extra interval symbol 614) appearing in an outcome of the feature game while in the third interval, proceeding to and performing 714 a feature game instance in the extra interval of the feature game.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

at least one display device;

at least one memory device storing instructions; and at least one processor in communication with the at least one display device and the at least one memory device, wherein the instructions, when executed by the at least one processor, cause the at least one processor to:

cause the at least one display device to display a user interface associated with a feature game, the user interface including an interval display element indicating a first interval of a plurality of intervals;

when the interval display element indicates the first interval, select a first tier of lookup tables corresponding to the first interval;

evaluate a random number generator (RNG) call outcome based on the first tier of lookup tables to determine a first feature game outcome;

cause the at least one display device to display the first feature game outcome, the first feature game outcome including a first plurality of feature game symbols;

in response to the first feature game outcome including an interval symbol, cause the interval display element to indicate a second interval of the plurality of intervals;

when the interval display element indicates the second interval, select a second tier of lookup tables corresponding to the second interval;

evaluate an RNG call outcome based on the second tier of lookup tables to determine a second feature game outcome; and cause the at least one display device to display the second feature game outcome, the second feature game outcome including a second plurality of feature game symbols.

2. The electronic gaming device of claim 1, wherein the first feature game outcome includes a first prize symbol including a first prize associated with the first tier of lookup tables, and wherein the second feature game outcome includes a second prize symbol including a second prize associated with the second tier of lookup tables.

3. The electronic gaming device of claim 1, wherein the second tier of lookup tables includes greater prize values than the first tier of lookup tables.

4. The electronic gaming device of claim 1, wherein the instructions further cause the at least one processor to:

cause a base game outcome to be displayed on the at least one display device, the base game outcome comprising a plurality of symbols included on a plurality of reels;

in response to the base game outcome including a bonus symbol on one of the plurality of reels, cause a bonus game to be initiated;

cause the at least one display device to display a bonus game outcome, the bonus game outcome including an output of a plurality of potential outputs included on a wheel; and in response to the bonus game outcome including a feature symbol, cause the feature game to be initiated.

5. The electronic gaming device of claim 1, wherein the instructions further cause the at least one processor to:

when the interval display element indicates a final interval of the plurality of intervals, select a final tier of lookup tables corresponding to the final interval;

evaluate an RNG call outcome based on the final tier of lookup tables to determine a final feature game outcome;

cause the at least one display device to display the final feature game outcome, the final feature game outcome including a final plurality of feature game symbols; and in response to the final feature game outcome including an interval symbol, terminate the feature game.

6. The electronic gaming device of claim 5, wherein the instructions further cause the at least one processor to:

in response to the final feature game outcome including an extra interval symbol, cause the interval display element to indicate an extra interval;

evaluate an RNG call outcome based on an extra tier of lookup tables to determine an extra feature game outcome;

cause the at least one display device to display the extra feature game outcome, the extra feature game outcome including an extra plurality of feature game symbols; and in response to causing the extra feature game outcome to be displayed, terminate the feature game.

7. The electronic gaming device of claim 6, wherein the extra feature game outcome includes at least one multiplier, and wherein the instructions cause the at least one processor to apply the multiplier to any prizes previously awarded during the feature game.

8. The electronic gaming device of claim 1, wherein the first plurality of feature game symbols includes a prize symbol including a credit prize.

9. A method for providing interval triggers in an electronic game, the method performed by at least one processor in communication with at least one memory device and at least one display device, the method comprising:

causing the at least one display device to display a user interface associated with a feature game, the user interface including an interval display element indicating a first interval of a plurality of intervals;

when the interval display element indicates the first interval, selecting a first tier of lookup tables corresponding to the first interval;

evaluating a random number generator (RNG) call outcome based on the first tier of lookup tables to determine a first feature game outcome;

causing the at least one display device to display the first feature game outcome, the first feature game outcome including a first plurality of feature game symbols;

in response to the first feature game outcome including an interval symbol, causing the interval display element to indicate a second interval of the plurality of intervals;

when the interval display element indicates the second interval, selecting a second tier of lookup tables corresponding to the second interval;

evaluating an RNG call outcome based on the second tier of lookup tables to determine a second feature game outcome; and causing the at least one display device to display the second feature game outcome, the second feature game outcome including a second plurality of feature game symbols.

10. The method of claim 9, wherein the first feature game outcome includes a first prize symbol including a first prize associated with the first tier of lookup tables, and wherein the second feature game outcome includes a second prize symbol including a second prize associated with the second tier of lookup tables.

11. The method of claim 9, wherein the second tier of lookup tables includes greater prize values than the first tier of lookup tables.

12. The method of claim 9, further comprising:

causing a base game outcome to be displayed on the at least one display device, the base game outcome comprising a plurality of symbols included on a plurality of reels;

in response to the base game outcome including a bonus symbol on one of the plurality of reels, causing a bonus game to be initiated;

causing the at least one display device to display a bonus game outcome, the bonus game outcome including an output of a plurality of potential outputs included on a wheel; and in response to the bonus game outcome including a feature symbol, causing the feature game to be initiated.

13. The method of claim 9, further comprising:

when the interval display element indicates a final interval of the plurality of intervals, selecting a final tier of lookup tables corresponding to the final interval;

evaluating an RNG call outcome based on the final tier of lookup tables to determine a final feature game outcome;

causing the at least one display device to display the final feature game outcome, the final feature game outcome including a final plurality of feature game symbols; and in response to the final feature game outcome including an interval symbol, terminating the feature game.

14. The method of claim 13, further comprising:

in response to the final feature game outcome including an extra interval symbol, causing the interval display element to indicate an extra interval;

evaluating an RNG call outcome based on an extra tier of lookup tables to determine an extra feature game outcome;

causing the at least one display device to display the extra feature game outcome, the extra feature game outcome including an extra plurality of feature game symbols; and in response to causing the extra feature game outcome to be displayed, terminating the feature game.

15. The method of claim 14, wherein the extra feature game outcome includes at least one multiplier, and wherein the method further comprises applying the multiplier to any prizes previously awarded during the feature game.

16. The method of claim 9, wherein the first plurality of feature game symbols includes a prize symbol including a credit prize.

17. A non-transitory computer-readable storage media having computer-executable instructions embodied thereon, wherein when executed by at least one processor in communication with at least one memory device and at least one display device, the computer-executable instructions cause the at least one processor to:

cause the at least one display device to display a user interface associated with a feature game, the user interface including an interval display element indicating a first interval of a plurality of intervals;

when the interval display element indicates the first interval, select a first tier of lookup tables corresponding to the first interval;

evaluate a random number generator (RNG) call outcome based on the first tier of lookup tables to determine a first feature game outcome;

cause the at least one display device to display the first feature game outcome, the first feature game outcome including a first plurality of feature game symbols;

in response to the first feature game outcome including an interval symbol, cause the interval display element to indicate a second interval of the plurality of intervals;

when the interval display element indicates the second interval, select a second tier of lookup tables corresponding to the second interval;

evaluate an RNG call outcome based on the second tier of lookup tables to determine a second feature game outcome; and cause the at least one display device to display the second feature game outcome, the second feature game outcome including a second plurality of feature game symbols.

18. The non-transitory computer-readable storage media of claim 17, wherein the first feature game outcome includes a first prize symbol including a first prize associated with the first tier of lookup tables, and wherein the second feature game outcome includes a second prize symbol including a second prize associated with the second tier of lookup tables.

19. The non-transitory computer-readable storage media of claim 17, wherein the second tier of lookup tables includes greater prize values than the first tier of lookup tables.

20. The non-transitory computer-readable storage media of claim 17, wherein the computer-executable instructions further cause the at least one processor to:

cause a base game outcome to be displayed on the at least one display device, the base game outcome comprising a plurality of symbols included on a plurality of reels;

in response to the base game outcome including a bonus symbol on one of the plurality of reels, cause a bonus game to be initiated;

cause the at least one display device to display a bonus game outcome, the bonus game outcome including an output of a plurality of potential outputs included on a wheel; and in response to the bonus game outcome including a feature symbol, cause the feature game to be initiated.

* * * * *